US010345457B2

(12) United States Patent
Ishikawa et al.

(10) Patent No.: US 10,345,457 B2
(45) Date of Patent: Jul. 9, 2019

(54) SCINTILLATION LIGHT DETECTING DEVICE AND RADIATION DETECTING DEVICE

(71) Applicant: National University Corporation Hokkaido University, Sapporo-shi, Hokkaido (JP)

(72) Inventors: Masayori Ishikawa, Sapporo (JP); Ryo Ogawara, Sapporo (JP)

(73) Assignee: National University Corporation Hokkaido University, Sapporo-shi, Hokkaido (JP)

( * ) Notice: Subject to any disclaimer, the term of this patent is extended or adjusted under 35 U.S.C. 154(b) by 0 days.

(21) Appl. No.: 15/756,728

(22) PCT Filed: Sep. 1, 2016

(86) PCT No.: PCT/JP2016/075725
§ 371 (c)(1),
(2) Date: May 14, 2018

(87) PCT Pub. No.: WO2017/038953
PCT Pub. Date: Mar. 9, 2017

(65) Prior Publication Data
US 2018/0252823 A1    Sep. 6, 2018

(30) Foreign Application Priority Data
Sep. 2, 2015   (JP) ................................. 2015-172498

(51) Int. Cl.
*G01T 1/20* (2006.01)
*G01T 1/202* (2006.01)
(Continued)

(52) U.S. Cl.
CPC ............ *G01T 1/2018* (2013.01); *G01T 1/208* (2013.01); *G01T 1/2008* (2013.01); *G01T 1/2023* (2013.01); *G01T 1/2985* (2013.01)

(58) Field of Classification Search
CPC .......... G01T 1/2018; G01T 1/161; G01T 1/20
See application file for complete search history.

(56) References Cited

U.S. PATENT DOCUMENTS 3,980,886 A * 9/1976 Stout ..................... G01T 1/1642
                                                         250/369
6,297,506 B1 * 10/2001 Young ................... G01T 1/2985
                                                         250/369
(Continued)

FOREIGN PATENT DOCUMENTS

JP    2004-279057 A    10/2004
JP    2004-532997 A    10/2004
(Continued)

OTHER PUBLICATIONS

Ishibashi H. et al., "Cerium Doped GSO Scintillators and Its Application to Position Sensitive Detectors," IEEE Transactions on Nuclear Science, vol. 36, No. 1, Feb. 1989, pp. 170-172 (3 pages).
(Continued)

*Primary Examiner* — Hugh Maupin
(74) *Attorney, Agent, or Firm* — Nixon Peabody LLP

(57) ABSTRACT

A scintillation light detecting device distinguishes between signals from scintillator elements. The device includes a scintillator array. In the scintillator array, the scintillator elements have mutually different decay time constants for emitted light generated as a result of an incident radiation event. A photomultiplier tube that receives light output from the scintillator elements and converts the light into an electrical signal. In relation to the event, an arithmetic processing device detects a peak value and an integrated charge quantity in a voltage waveform of the electrical
(Continued)

signal from the photomultiplier tube, and identifies the scintillator element in the scintillator array to which the electrical signal, resulting from the incidence of radiation onto the scintillator element, is attributable, in accordance with a ratio between the detected peak value and integrated electric charge quantity.

15 Claims, 16 Drawing Sheets

(51) Int. Cl.
  *G01T 1/29* (2006.01)
  *G01T 1/208* (2006.01)

(56) References Cited

U.S. PATENT DOCUMENTS

| | | | |
|---|---|---|---|
| 6,459,086 B1* | 10/2002 | Kline | G01T 1/249 |
| | | | 250/370.01 |
| 2002/0195565 A1 | 12/2002 | Lecoq | |
| 2004/0178347 A1 | 9/2004 | Murayama | |
| 2009/0121141 A1 | 5/2009 | Eriksson | |
| 2013/0056638 A1 | 3/2013 | Inadama et al. | |
| 2014/0209804 A1 | 7/2014 | Lee | |
| 2015/0028218 A1 | 1/2015 | Kataoka | |

FOREIGN PATENT DOCUMENTS

| | | |
|---|---|---|
| JP | 2013-140024 A | 7/2013 |
| WO | WO 03/001242 A1 | 1/2003 |
| WO | 2011121707 A1 | 6/2011 |
| WO | WO 2011/121707 A1 | 6/2011 |
| WO | WO 2016/136480 A1 | 9/2016 |

OTHER PUBLICATIONS

Melcher C.L. et al., "Scintillation Properties of GSO," IEEE Transactions on Nuclear Science, vol. 37, No. 2, Apr. 1990, pp. 161-164 (4 pages).

International Search Report for Application No. PCT/JP2016/075725, dated Oct. 11, 2016, with English translation (5 pages).

Written Opinion of International Searching Authority for Application No. PCT/JP2016/075725, dated Oct. 11, 2016 (9 pages).

* cited by examiner

SCINTILLATION LIGHT DETECTING DEVICE AND RADIATION DETECTING DEVICE

CROSS-REFERENCE TO RELATED APPLICATION

This application is a U.S. National Stage of International Application No. PCT/JP2016/075725, filed Sep. 1, 2016, which is related to and claims the benefit and priority of Japanese Patent Application No. 2015-172498, filed Sep. 2, 2015, the contents of which are incorporated herein in their entireties by reference.

TECHNICAL FIELD

The present disclosure relates to a scintillation light detecting device for identifying a unit scintillator on which radiation is incident, in a scintillator array formed by arranging a plurality of unit scintillators, and to a radiation detecting device using the same.

BACKGROUND

One method of cancer diagnosis is a positron emission tomography (PET) examination. In this PET examination, a test agent in which a radioactive substance is bound to a sugar which is likely to gather in cancer cells is administered to a patient. Then, a pair of γ rays (hereinafter, referred to as annihilation γ rays) are detected, which are generated when electron-positron annihilation occurs in the radioactive substance in the test agent gathered in the cancer cells and the generated positrons disappear. In particular, this pair of annihilation γ rays travel in opposite directions by 180 degrees. Therefore, the locations of cancer cells and the like may be identified by detecting the positions of the pair of annihilation γ rays simultaneously incident on the radiation detectors disposed around the specimen, and from the point of view that the radioactive substances exist on the straight line connecting the detection positions, repeatedly measuring this to create a reconstructed image as in a computed tomography (CT).

In such a PET examination device, a large number of detectors are arranged in a space surrounding a patient and identify a detector pair on which the annihilation γ rays are incident. Since the efficiency of radiation detection increases as the number of detectors increases, it is desirable to arrange a large number of detectors. However, as the number of detectors increases, the processing and cost of simultaneous detection events also increase, so that in many cases an inexpensive system using a scintillator and a position sensitive photomultiplier tube is adopted.

Here, in the conventional PET detectors, a large number of detectors are arranged in a ring shape around the patient, but the detectors do not have a resolution with respect to a direction towards the patient (depth direction), so that it is difficult to identify positions with the detectors. Therefore, when the annihilation γ rays are incident on the detectors from an oblique direction, the spatial resolution (position resolution) is reduced.

As a means for solving this, a depth of interaction (DOI) detector has been proposed. In the DOI detector, a plurality of scintillators are arranged in the depth direction, and a measure for distinguishing emission signals from these scintillators is applied, thereby enabling discrimination in the depth direction. Therefore, the spatial resolution of annihilation γ rays incident from an oblique direction may be increased.

CITATION LIST

Patent Literature

[Patent Literature] WO2011/121707

SUMMARY

Technical Problem

In the DOI detector, a signal from a plurality of scintillators arranged in the depth direction is input to one photomultiplier tube to discriminate from which scintillator in the depth direction the signal is derived. In order to discriminate this signal, special measures are necessary and it is not necessarily easy. In addition, there is also a problem that the number of scintillators in the depth direction cannot be made too large.

Solution to Problem

A scintillation light detecting device of the present disclosure includes: a scintillator array in which a plurality of scintillator elements having different decay time constants of emitted light generated by an incident event of radiation are arranged; a photoelectric converter that receives light output from the plurality of scintillator elements of the scintillator array and converts the light into an electrical signal; and an arithmetic processing device configured to detect, for the event, a peak value and an integrated charge amount in a voltage waveform of the electrical signal from the photoelectric converter and identify a scintillator element in the scintillator array to which the electrical signal, resulting from the incidence of the radiation onto the scintillator element, is attributed, in accordance with a ratio between the detected peak value and integrated charge amount. The integrated charge amount may be substituted by an integral value of the electrical signal.

In the scintillator array, the plurality of scintillator elements may be arranged in one row, and light from the plurality of scintillator elements may be output from a scintillator element at one end of the one row.

A plurality of the scintillator arrays may be arranged, the photoelectric converter may separately receive light from individual scintillator arrays and output separate electrical signals, and the arithmetic processing device may identify a scintillator element of a scintillator array to which each of the electrical signals, resulting from the incidence of the radiation onto the scintillator element of the scintillator array, is attributed, in accordance with a ratio between a peak value and an integrated charge amount in a voltage waveform of each electrical signal.

The plurality of scintillator elements having different decay time constants may include scintillator elements in which concentrations of activating materials are different from each other.

The plurality of scintillator elements having different decay time constants may include scintillator elements in which materials constituting the scintillator elements are different from each other.

The plurality of scintillator elements having different decay time constants may include scintillator elements in which concentrations of activating materials are different from each other and materials constituting the scintillator elements are different from each other.

The energy of annihilation γ rays is not necessarily absorbed by one scintillator element, but the energy may be absorbed over a plurality of scintillator elements and detected as an incorrect position (hereinafter, referred to as a crosstalk event). The crosstalk event may be eliminated by utilizing differences in output energy and the ratio between the peak value in the voltage waveform of each electrical signal and the integrated charge amount, with respect to the plurality of scintillator elements having different materials.

A radiation detecting device of the present disclosure includes: a scintillator array group in which a plurality of scintillator arrays in which a plurality of scintillator elements having different decay time constants of emitted light generated by an incident event of radiation are arranged, are disposed at a plurality of spatially different positions; a photoelectric converter that receives light output from each of the plurality of scintillator elements of the scintillator arrays of the scintillator array group and converts the light into an electrical signal for each of the scintillator element; and an arithmetic processing device configured to detect, for the event, a spatial position of a radiation source by identifying a scintillator element in the scintillator array to which the electrical signal, resulting from the incidence of the radiation onto the scintillation element, is attributed and identifying a plurality of scintillator element on which the radiation is incident, in accordance with a ratio between a peak value and an integrated charge amount in a voltage waveform of the electrical signal from the photoelectric converter.

Advantageous Effects of Invention

According to the device of the present disclosure, it is possible to discriminate light input from a plurality of scintillator elements. Therefore, when a plurality of scintillator elements are arranged side by side and the optical signal from one end thereof is converted into an electrical signal by the photoelectric converter, it is possible to accurately identify a scintillator element to which the electrical signal, resulting from the incidence of the radiation onto the scintillator element, is attributed, in accordance with a ratio between the peak value and integrated charge amount in the voltage waveform. For example, effective discrimination of signals may be performed in a DOI detector or the like such that the number of scintillator elements arranged in the depth direction is increased.

DESCRIPTION OF EMBODIMENTS

Figure 1:
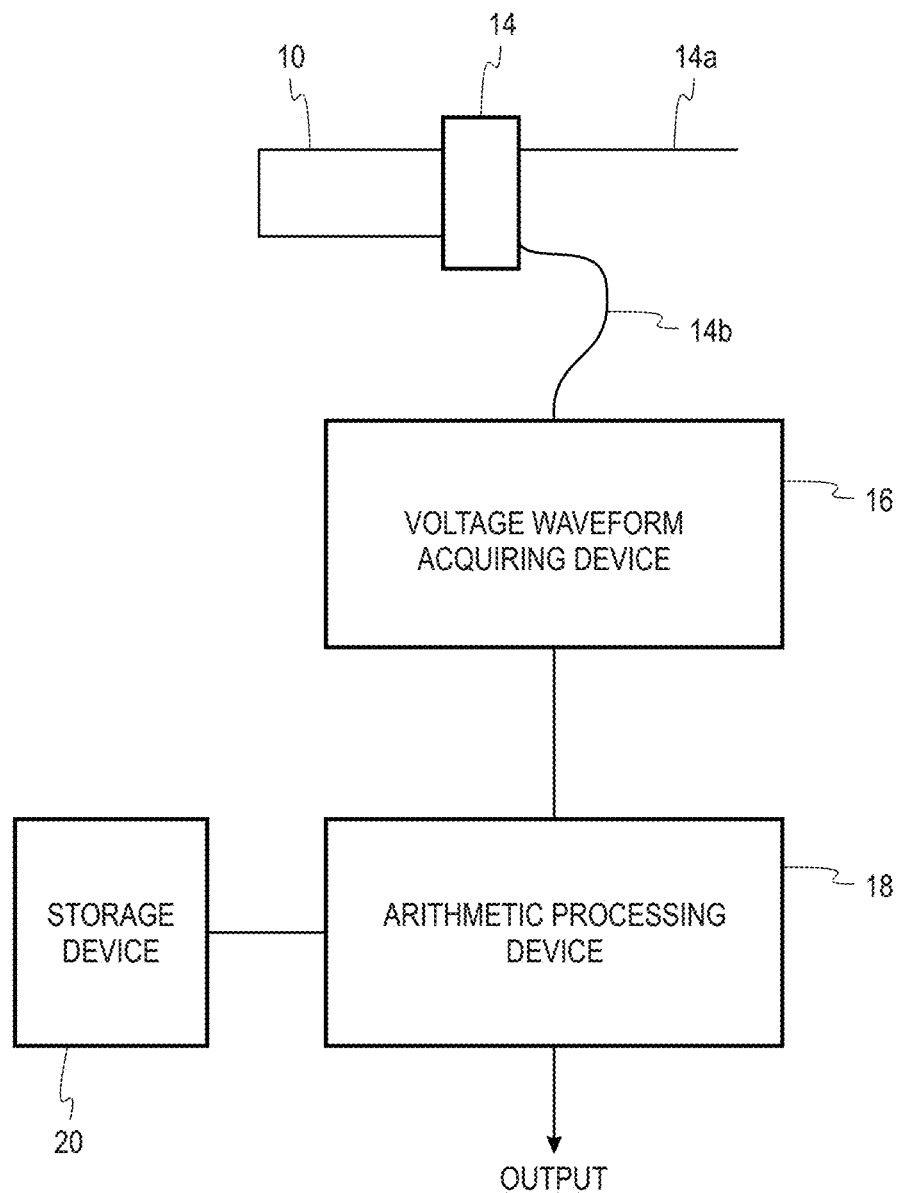
FIG. 1 is a diagram illustrating an example of a configuration of a scintillation light detecting device.

Hereinafter, exemplary embodiments of a scintillation light detecting device and a radiation detection device of the present disclosure will be described with reference to the drawings. The device of the present disclosure is not limited to the exemplary embodiments described here.

<Outline of Scintillation Light Detecting Device>

The outline of the scintillation light detecting device of the present disclosure will be described. First, the present applicant has filed a priority application No. 2015-35788 (prior application). In this prior application, an object thereof is to separate α decay events caused by self-radioactivity when detecting γ rays using a LaBr3 scintillator. Then, focusing on the difference in a voltage waveform (pulse waveform) of a signal obtained by emitted light due to incidence of radiation, a ratio ($V_p/Q_{total}$) of a voltage peak value $V_p$ of the voltage waveform at each event to an integrated charge amount (total charge amount) is calculated. Then, $V_p/Q_{total}$ is used as an indicator, so that α decay events are excluded and events of γ rays to be detected are counted. The integrated charge amount is a result of time-integrating a voltage V which is an electrical signal for one event (one peak) and may be substituted as an integrated value of the electrical signal. In the present exemplary embodiment, the integral value of the voltage V, which is an electrical signal, is used as the integral charge amount.

Here, as for the discrimination of events by $V_p/Q_{total}$, theoretical consideration has been made, and it has been found that this discrimination performance depends on the decay time of the light emitted by the scintillator. That is, the decay time of the emitted light of the scintillator in the event of the γ rays to be detected differs from the decay time of the emitted light in the event of the α decay, so that $V_p/Q_{total}$ is different.

Meanwhile, in a GSO ($Gd_2SiO_5$):Ce scintillator (cerium doped GSO scintillator) used in a PET examination device, a decay time constant of emitted light varies depending on the Ce concentration. For example, the relation between the Ce concentration and the decay time constant is described in literature (C. L. Melcher and J. S. Schweitzer "SCINTILLATION PROPERTIES OF GSO" IEEE TRANSACTIONS ON NUCLEAR SCIENCE, VOL. 37, NO. 2, April 1990). In this example, it is reported that the decay time constant is 190, 56, 32, 27, 19 ns when the Ce concentration is 0.1, 0.5, 0.95, 1.5, 2.0, 5.0 mol %.

Therefore, the scintillation light detecting device of the present disclosure is provided with a plurality of GSO scintillator elements in which the Ce concentration has been changed, and examines $V_p/Q_{total}$ of the voltage waveforms obtained from them, thereby discriminating from which scintillator element the signal is derived.

Furthermore, LuAG (ruthenium•aluminum •garnet):Pr scintillator (praseodymium doped LuAG scintillator) is also known as a scintillator used in PET examination, and the decay time constant of the emitted light varies depending on the amount of Pr doped. Therefore, it may also be used.

Furthermore, the decay time constants of the emitted light differ between the GSO ($Gd_2SiO_5$):Ce scintillator and the LuAG (ruthenium•aluminum•garnet):Pr scintillator. Therefore, upon discriminating signals by combining both, signals from more scintillator elements may be discriminated. Other scintillator materials may also be used.

Here, in the PET examination, a DOI detector is known to improve its spatial resolution. The DOI detector separates signals from a plurality of scintillator elements arranged in the depth direction. In the scintillation light detecting device of the present disclosure, signals from a plurality of scintillator elements may be separated as described above. Hence, since signals from a plurality of scintillator elements arranged in the depth direction are effectively separated by the scintillation light detecting device of the present disclosure, it is possible to construct a DOI detector having a higher spatial resolution with a simpler configuration.

Since the scintillation light detecting device is able to discriminate signals based on light from a plurality of scintillator elements incident on one photomultiplier tube (photoelectric converter), the application thereof is not limited to the DOI detector.

<Overall Configuration>

FIG. 1 is the entire configuration diagram of a scintillation light detecting device according to the present exemplary embodiment. A scintillator array 10 is formed by arranging a plurality of scintillator elements 12 (12a to 12e) that emit light upon incidence of radiation, in one row. One end of the scintillator array 10 is connected to a photomultiplier tube 14 which is a photoelectric converter. A light receiving surface is formed in a portion of the photomultiplier tube 14 to which the scintillator array 10 is connected, and the light emitted from the scintillator elements 12a to 12e is incident thereon.

The incident light is photoelectrically converted by the photomultiplier tube 14, and an electrical signal corresponding to the intensity of the incident light is output. The electrical signal from the photomultiplier tube 14 is input to an electric waveform acquiring device 16 where a voltage waveform signal along the time axis is obtained. An oscilloscope or the like may be adopted as the electric waveform acquiring device 16.

An output of the electric waveform acquiring device 16 is stored in a storage device 20 via an arithmetic processing device 18. That is, raw data of the voltage waveform signal (data not subjected to waveform shaping or the like (Raw)) is stored in the storage device 20 as it is.

The arithmetic processing device 18 is constituted by an ordinary computer, analyzes data on a voltage waveform (a voltage waveform signal), and outputs an analysis result. That is, the arithmetic processing device 18 performs the following analysis processes at the end of one examination over a predetermined time.

Figure 2:
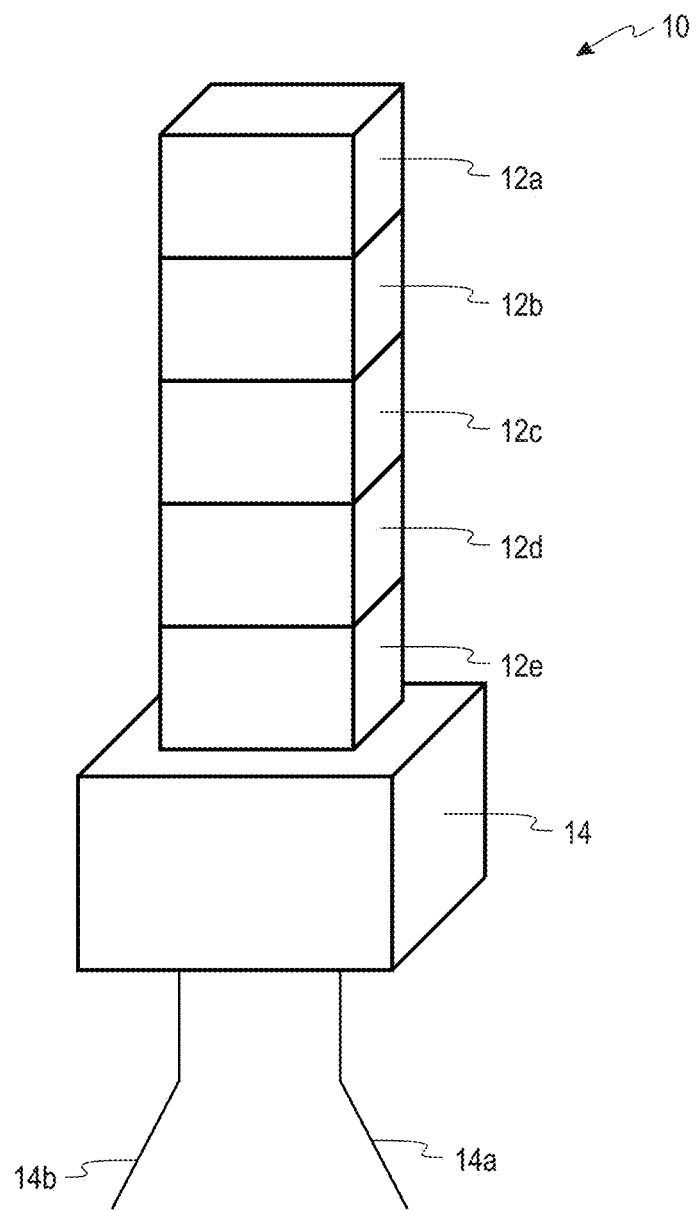
FIG. 2 is a diagram illustrating an example of a configuration of a scintillator array.

(a) A process of filtering the waveform signal (b) A process of calculating an integrated charge amount Qtotal and the peak value Vp to calculate Vp/Qtotal (c) A process of identifying from which scintillator element each voltage waveform signal (electrical signal) is derived, using a threshold value set for the integrated charge amount Qtotal and Vp/Qtotal Here, FIG. 2 illustrates the scintillator array 10 and the photomultiplier tube 14. The scintillator array 10 is formed by stacking five scintillator elements 12a to 12e in one row, and the bottom side of the scintillator element 12e is connected to the light receiving surface of the photomultiplier tube 14. Therefore, even when radiation is incident on any of the five scintillator elements 12a to 12e and emits light, the light is input to the photomultiplier tube 14. Thus, in the output (electrical signal) from the photomultiplier tube 14, it is unknown on which one of the scintillator elements 12a to 12e the light emission according to the incidence of the radiation is based. By the analysis of the arithmetic processing device 18, it is identified which one of the scintillator elements 12a to 12e emits light.

Figure 3:
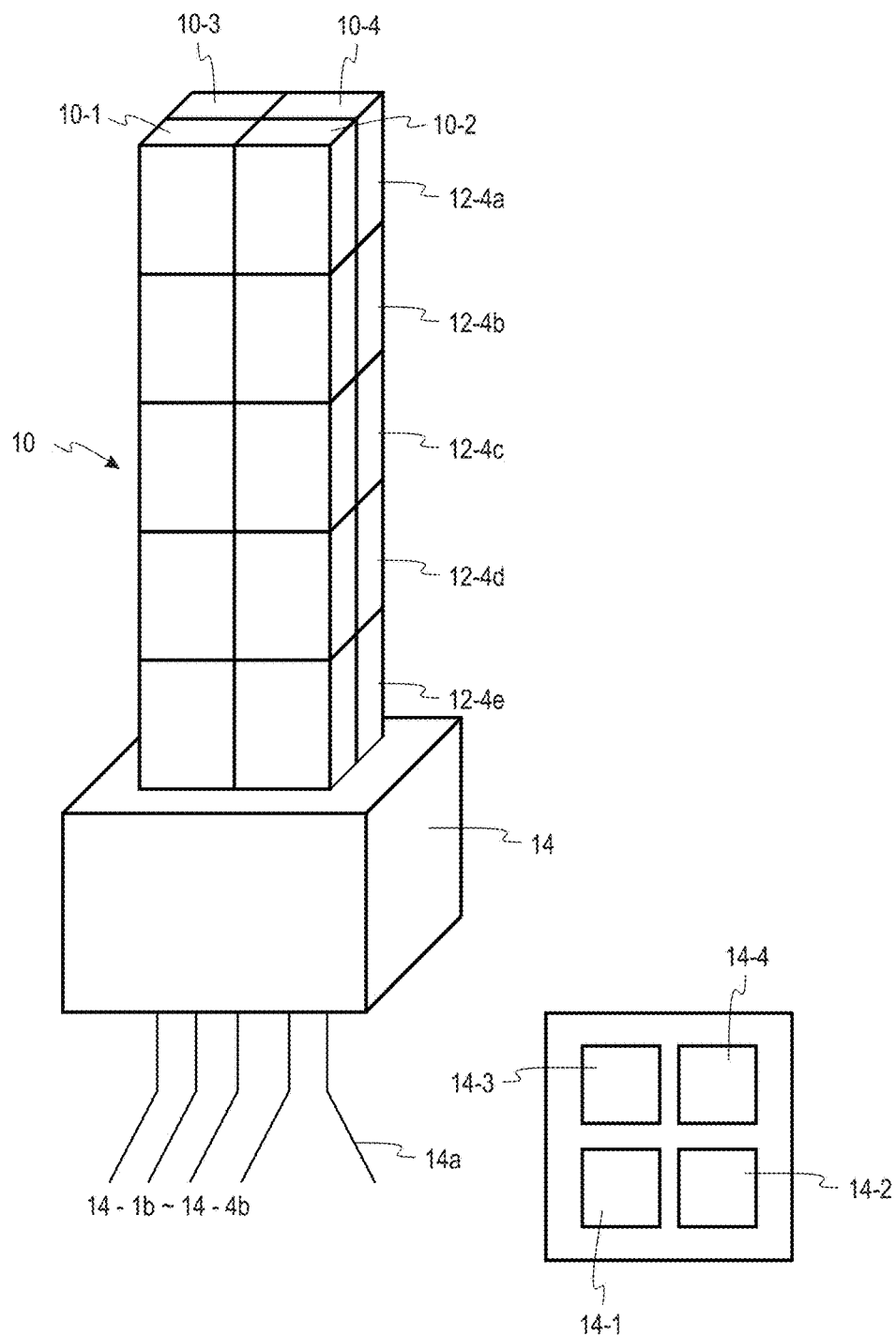
FIG. 3 is a diagram illustrating an example in which a plurality of scintillator arrays are provided.

FIG. 3 illustrates an example in which a plurality of (four) scintillator arrays 10 are arranged in a matrix form to form a scintillator block. That is, scintillator arrays 10-1 to 10-4 are arranged collectively on the light receiving surface of the photomultiplier tube 14. In each of the scintillator arrays 10-1 to 10-4, scintillator elements 12-1a to 12-4a are positioned at the top, and scintillator elements 12-1e to 12-4e at the bottom are positioned on the photomultiplier tube 14.

The light receiving surface of the photomultiplier tube 14 is illustrated on the lower right side of FIG. 3. In this manner, light receiving sections 14-1 to 14-4 are provided corresponding to the scintillator arrays 10-1 to 10-4, respectively, and the light from the corresponding scintillator arrays 10-1 to 10-4 is incident from the light receiving sections 14-1 to 14-4, respectively. The photomultiplier tube 14 has signal lines 14-1b to 14-4b connected to four anodes, and signals corresponding to the light from the scintillator arrays 10-1 to 10-4 are individually supplied to the electric waveform acquiring device 16.

In the example of FIG. 3, the scintillator block is constituted by arranging the four scintillator arrays 10-1 to 10-4 in a matrix form, but it may be constructed with, for example, 5×5=25 or more.

<Configuration of Scintillator Element>

In the present exemplary embodiment, the scintillator elements 12a to 12e are different in decay time constant of emitted light. The change in the time constant of emitted light corresponds to the decay time constant of the voltage waveform obtained by the electric waveform acquiring device 16.

For example, in the GSO ($Gd_2SiO_5$):Ce (cerium doped GSO) scintillator which is widely used as a scintillator for PET, it is known that Ce is contained as an activating material in a single crystal of GSO, and the decay time constant of emitted light varies depending on the Ce concentration. In addition, in the LuAG (ruthenium•aluminum•garnet):Pr (praseodymium doped LuAG) scintillator, the decay time constant of emitted light varies depending on the amount of an activating material Pr doped to the LuAG crystal. Even in a scintillator using other materials, it is possible to control the decay time constant of emitted light by the doped amount of the activating material such as cerium, and any material may be used as long as the decay time constant is controlled.

As described above, the decay time constant varies by changing the addition amount of the activating material. In the present exemplary embodiment, the scintillator elements 12a to 12e having different decay time constants are arrayed in one row as described above, and light from either side is incident on the photomultiplier tube 14.

<Processing in Arithmetic Unit>

(a) Filtering Process

Since the voltage waveform signal output from the electric waveform acquiring device 16 contains noise, it is preferable to remove the noise for subsequent processing (calculation of Vp/Qtotal). Therefore, it is preferable to remove the noise by moving-averaging the voltage waveform signal with a time width of, for example, several ns (2 ns), or by removing the high frequency noise of 50 MHz or more with a low pass filter.

Figure 4:
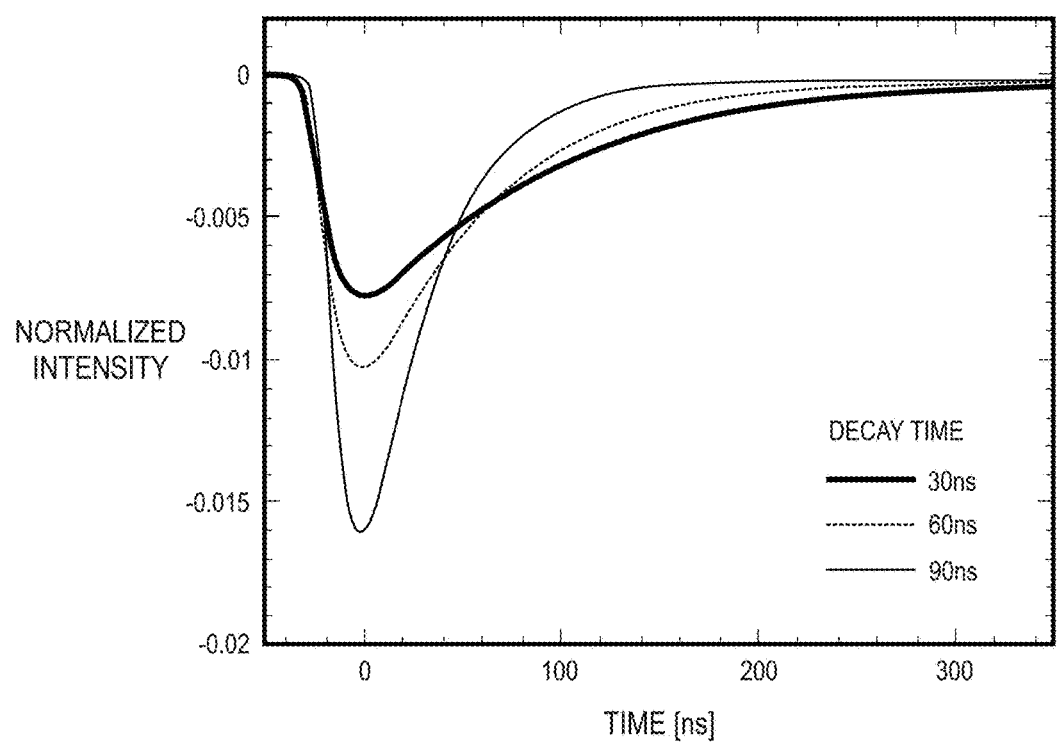
FIG. 4 is a diagram illustrating an example of a voltage waveform.

FIG. 4 illustrates voltage waveforms output from the electric waveform acquiring device 16 for one event observed in a GSO:Ce scintillator element. The vertical axis represents normalized intensity, and the horizontal axis represents time [ns]. Waveforms for three types of scintillator elements having decay time constants of 30, 60, and 90 ns, respectively, are illustrated.

(b) Calculation of Vp/Qtotal

The peak voltage Vp and the total charge Qtotal may be calculated from the voltage waveform illustrated in FIG. 4. That is, the peak voltage is a voltage with the largest absolute value of the voltage value, and is about −0.008, −0.01, and −0.016 at the decay time constants of 30 ns, 60 ns, and 90 ns, respectively. Meanwhile, the total charge Qtotal is a result obtained by time-integrating the voltage V with respect to one event (integral charge amount), and is obtained by integrating the peak area of each curve in FIG. 4. Therefore, the total charge Qtotal has a dimension of normalized V*ns (time). Here, since the time-integrated value of the voltage depends on the light amount at the time of incidence of radiation to the scintillator (1 event) and corresponds to the amount of electric charge received in the photomultiplier tube 14, the total charge Qtotal is used here. That is, in the present exemplary embodiment, an electric current from the photomultiplier tube 14 is subjected to current/voltage conversion by the electric waveform acquiring device 16. Therefore, the value of the voltage after the current/voltage conversion varies depending on an input impedance R [Ω] and has a relationship of V=IR (for example, R=50Ω), this voltage corresponds to the current, and its integration corresponds to the charge amount.

In the present exemplary embodiment, the object is to calculate the ratio (Vp/Qtotal) of Vp and Qtotal and use it as a parameter, it may be standardized for voltage, and any unit may be used for Qtotal. That is, Vp/Qtotal is a value corresponding to (peak of light emission intensity)/(total light emission amount) in one event, and in terms of voltage waveform, (voltage peak value)/(peak area: integral value) corresponds to Vp/Qtotal.

Figure 5:
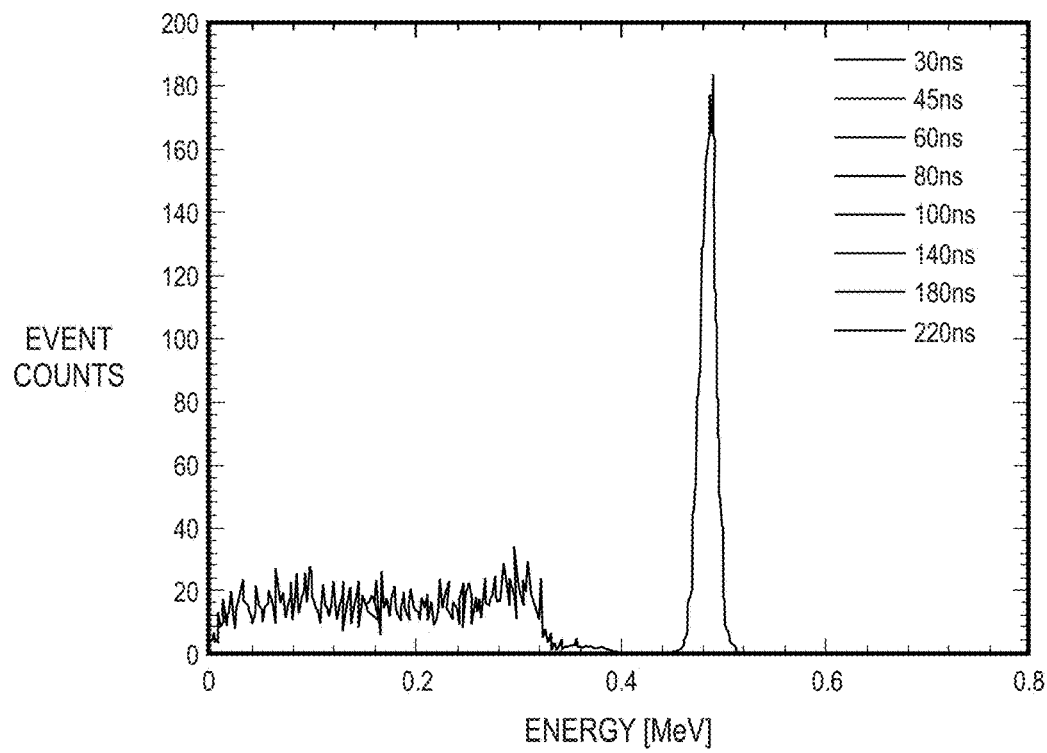
FIG. 5 is a diagram illustrating an example of event counts by energy.

FIG. 5 is a graph obtained by simulating the observed event counts for GSO (Gd$_2$SiO$_5$):Ce scintillators with various decay time constants and plotting the results against energy. The result pertains to the GSO:Ce scintillator set to 8 kinds of decay time constants of 30, 45, 60, 80, 100, 140, 180, and 220 ns according to the Ce concentration, and there was no significant difference in each scintillator (in FIG. 5, the results for respective scintillators may not be distinguished).

Figure 6:
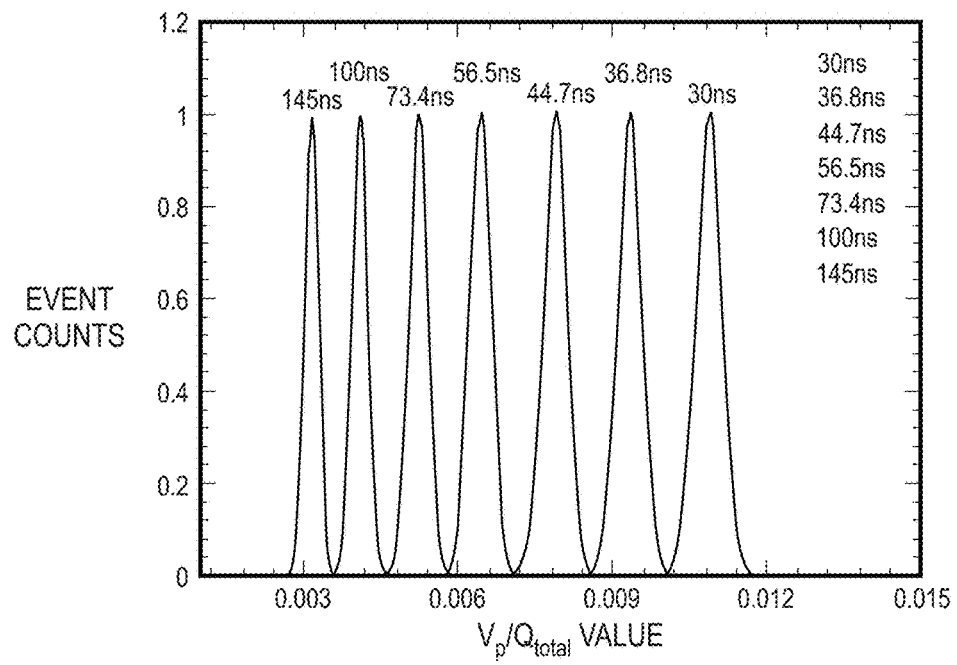
FIG. 6 is a diagram illustrating an example of event counts for $V_p/Q_{total}$ by decay time constant.

FIG. 6 is a graph obtained by plotting the observation results of the scintillator elements having decay time constants of 30 ns, 36.8 ns, 44.7 ns, 56.5 ns, 73.4 ns, 100 ns, and 145 ns as the event counts for each Vp/Qtotal. From the results, it can be seen that it is possible to separate the signals from the scintillator elements with seven decay time constants.

<Determining Process of Threshold>

Figure 7:
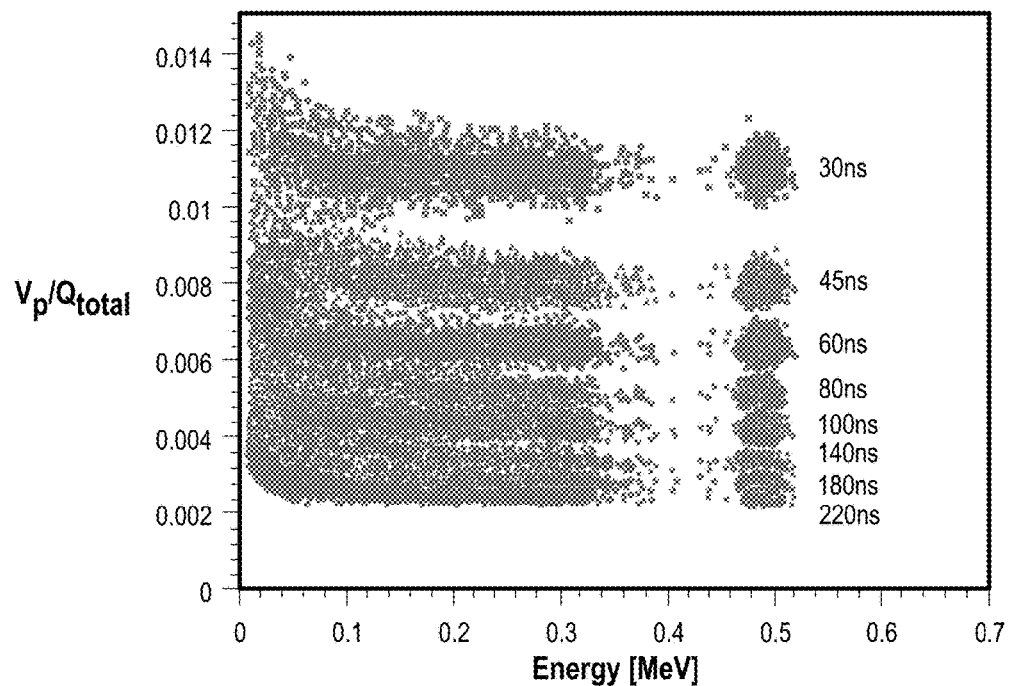
FIG. 7 is a diagram illustrating an example of $V_p/Q_{total}$ for each energy level by decay time constant.

FIG. 7 is a graph obtained by calculating Vp/Qtotal for each event observed in the GSO (Gd$_2$SiO$_5$):Ce scintillator and plotting the energy on the horizontal axis. Since the annihilation γ rays have energy of 511 keV, a threshold value is determined for the region including this energy. Further, signals from a plurality of scintillator elements may be discriminated by setting a Vp/Qtotal boundary value corresponding to the scintillator element of each decay time constant as a threshold. In this manner, it can be seen that Vp/Qtotal for the observed events changes due to the difference in the decay time constant, and the event may be separated based on the decay time constant. From FIG. 7, it can be seen that it is theoretically possible to perform seven stages of separation, and even in consideration of error caused by the measuring instrument, five stages of separation may be reliably performed.

Figure 8:
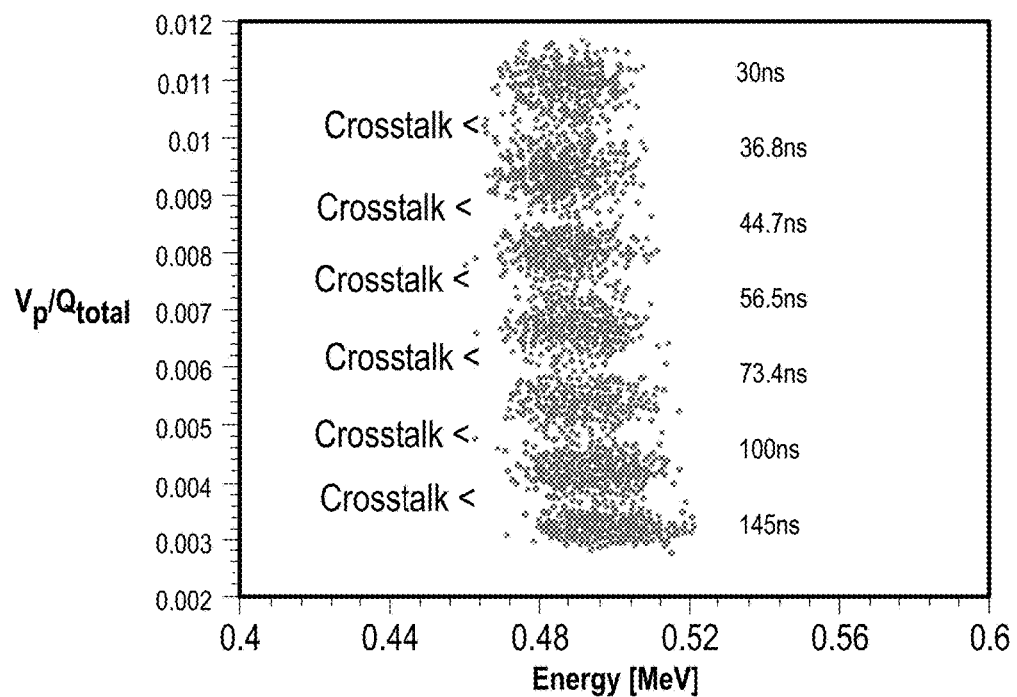
FIG. 8 is a diagram illustrating an example of $V_p/Q_{total}$ for each decay time constant in the vicinity of energy of 500 keV.

FIG. 8 illustrates the distribution of Vp/Qtotal for a γ ray event with energy of 511 keV. In the figure, the portion indicated by "<" is a region where a crosstalk event possibly occurs, and even when scintillator elements having the same type of scintillator materials and having different decay time constants are used, complete discrimination is difficult.

Any threshold value may be set, so long as the γ ray event is identified by the difference in decay time constant, and may also be obtained by setting a coefficient such as a polynomial or an exponential function to an appropriate value.

<Other Configuration Examples>

Figure 9:
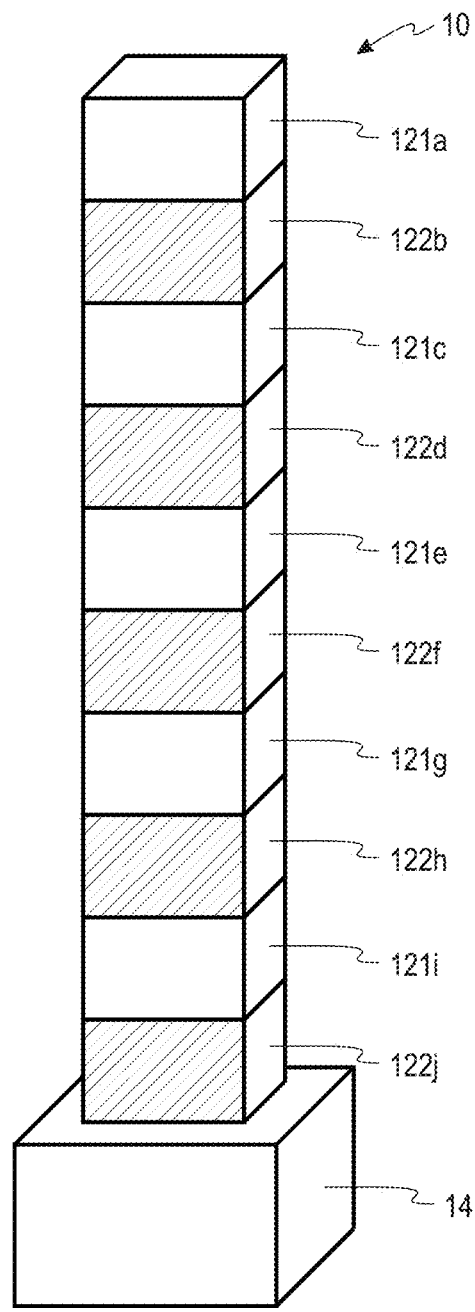
FIG. 9 is a diagram illustrating an example of a configuration of a scintillator array including scintillator elements having different materials.

FIG. 9 illustrates another configuration example of the scintillator array 10. In this example, ten scintillator elements 121a, 122b, 121c, 122d, 121e, 122f, 121g, 122h, 121i, and 122j are stacked in this order. And, for the scintillator elements 121a, 121c, 121e, 121g, and 121i, a material having a different decay time constant obtained by changing the Ce concentration in the GSO:Ce scintillator is adopted, and for the scintillator elements 122b, 122d, 122f, 122h, and 122j, a material having a different decay time constant obtained by changing the Pr concentration in the LuAG:Pr scintillator is adopted. In the figure, shaded hatching is given to the front region of a scintillator element 122, and two kinds of scintillator elements 121 and 122 are distinctively illustrated. The size of one scintillator element 121, 122 is a cube with 2.5 mm side.

In this example, the decay time constants of the ten scintillator elements 121a, 122b, 121c, 122d, 121e, 122f, 121g, 122h, 121i, 122j are set to 30 ns, 15 ns, 36.8 ns, 16.6 ns, 44.7 ns, 18.6 ns, 56.5 ns, 21.1 ns, 73.4 ns, and 24.3 ns, respectively.

Figure 10:
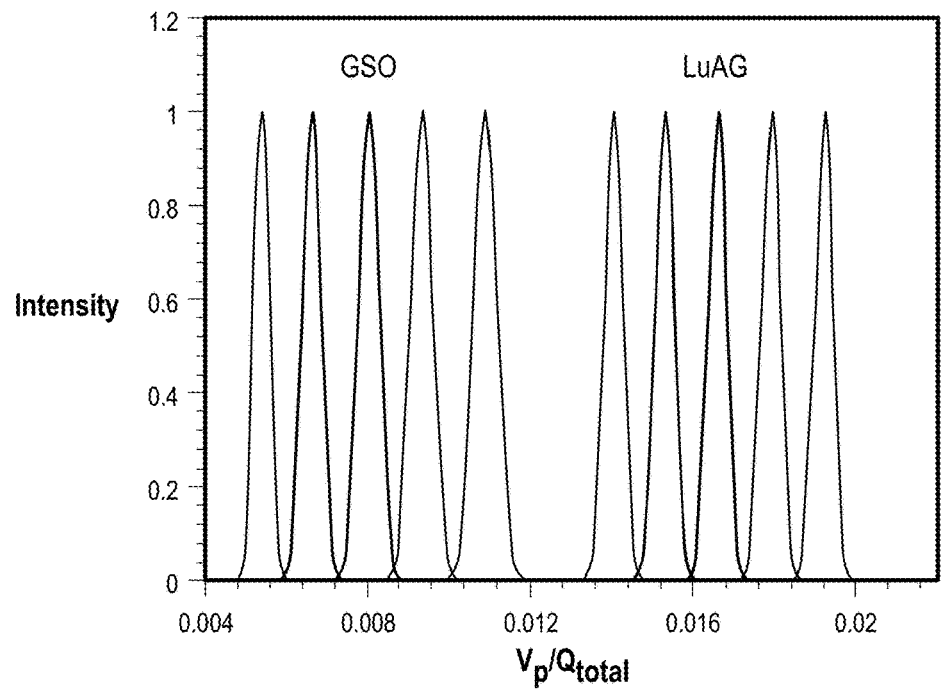
FIG. 10 is a diagram illustrating an example of event counts for $V_p/Q_{total}$ by decay time constant for GSO and LuAG.

For such a scintillator array 10, a simulation for obtaining a voltage waveform by inputting γ rays of 511 keV was performed to calculate and plot the Vp/Qtotal. As a result, as illustrated in FIG. 10, the values of Vp/Qtotal in the GSO scintillator and the LuAG scintillator are deviated from each other. Therefore, it was found that in the scintillator array 10 of FIG. 9, it is possible to discriminate signals from 10 scintillator elements. In FIG. 10, the vertical axis represents intensity obtained by normalizing the event counts.

Figure 11:
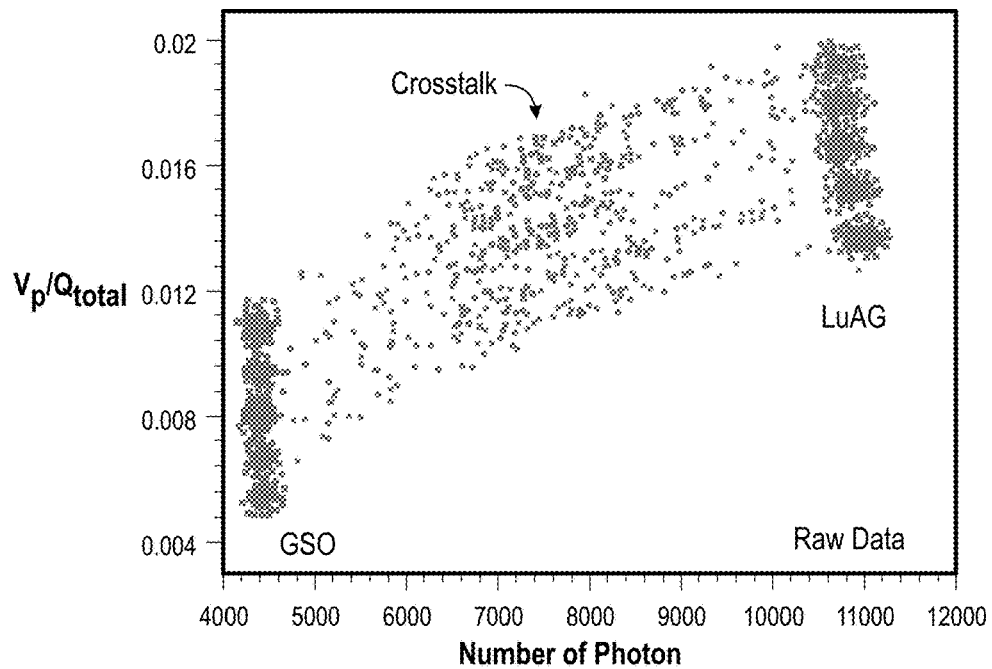
FIG. 11 is a diagram illustrating an example of $V_p/Q_{total}$ for the number of photons of GSO and LuAG.
Figure 12:
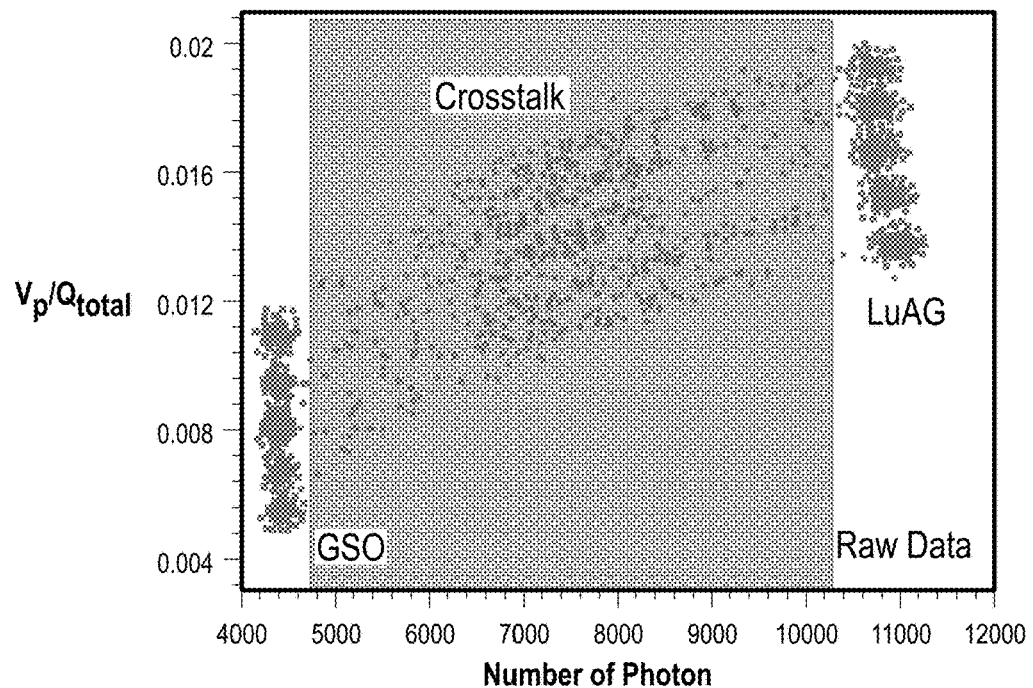
FIG. 12 is a diagram illustrating an example of elimination of crosstalk events by energy.
Figure 13:
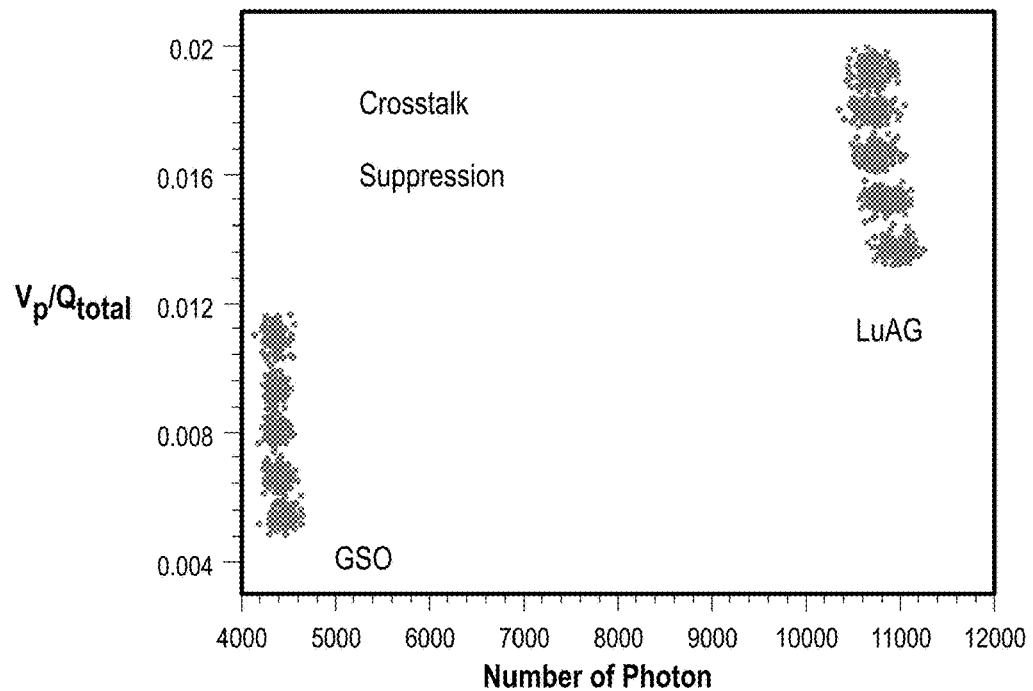
FIG. 13 is a diagram illustrating an example of $V_p/Q_{total}$ for the number of photons after crosstalk removal.

FIG. 11 illustrates a plot of the number of photons on the horizontal axis and Vp/Qtotal on the vertical axis. The number of photons is proportional to the energy of the annihilation γ rays incident, but depends on the characteristics of the scintillator. Thus, in the case where the γ rays of 511 keV are incident, the number of photons differs between the GSO scintillator and the LuAG scintillator. Meanwhile, from the observation data, events of the number of photons between the GSO scintillator and the LuAG scintillator also appear, which are considered to be noise due to crosstalk events. Therefore, intermediate events of the number of photons are deleted as indicated by a square in FIG. 12. As a result, as illustrated in FIG. 13, an observation result in which crosstalk is suppressed is obtained.

That is, when alternately arranging the scintillator elements of GSO:Ce and the scintillator elements of LuAG:Pr, it is possible to eliminate events caused by the crosstalk according to the amount of light emitted by them.

Figure 14:
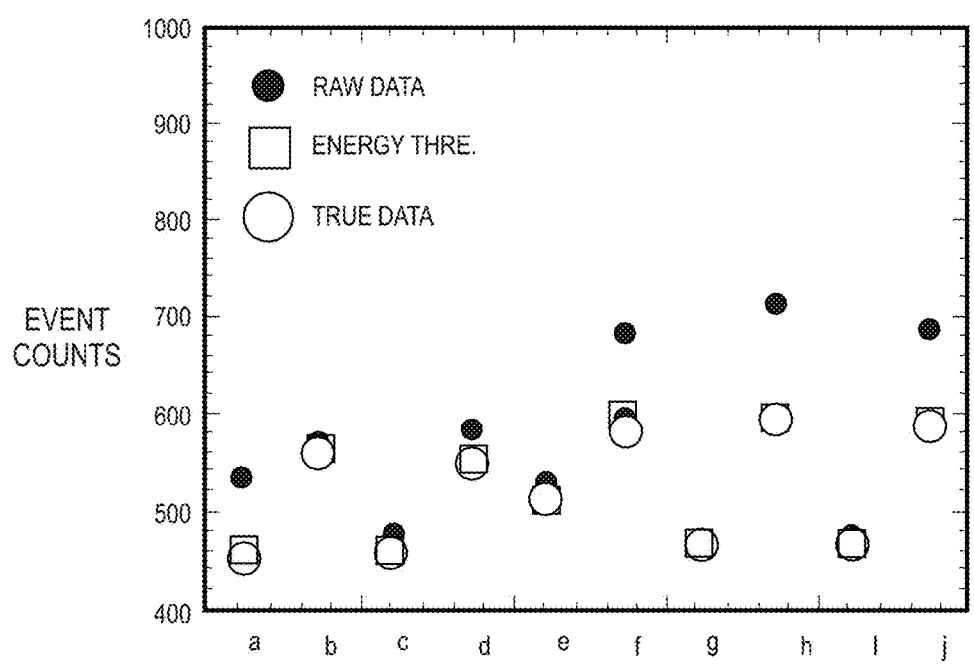
FIG. 14 is a diagram illustrating an example of elimination of crosstalk events by energy.

FIG. 14 illustrates a plot of event counts for ten scintillator elements 12a to 12j (indicated by a to j in the figure). Black circles indicate raw data, squares indicate data when crosstalk is eliminated using an energy (number of photons) threshold, and white circles indicate data not including crosstalk obtained by simulation (true data). Therefore, it can be seen that, when the crosstalk is eliminated by using the energy threshold, the count number substantially approaches the true data. The energy threshold may also be determined from the observation result of the scintillator elements of one type of material.

Figure 15:
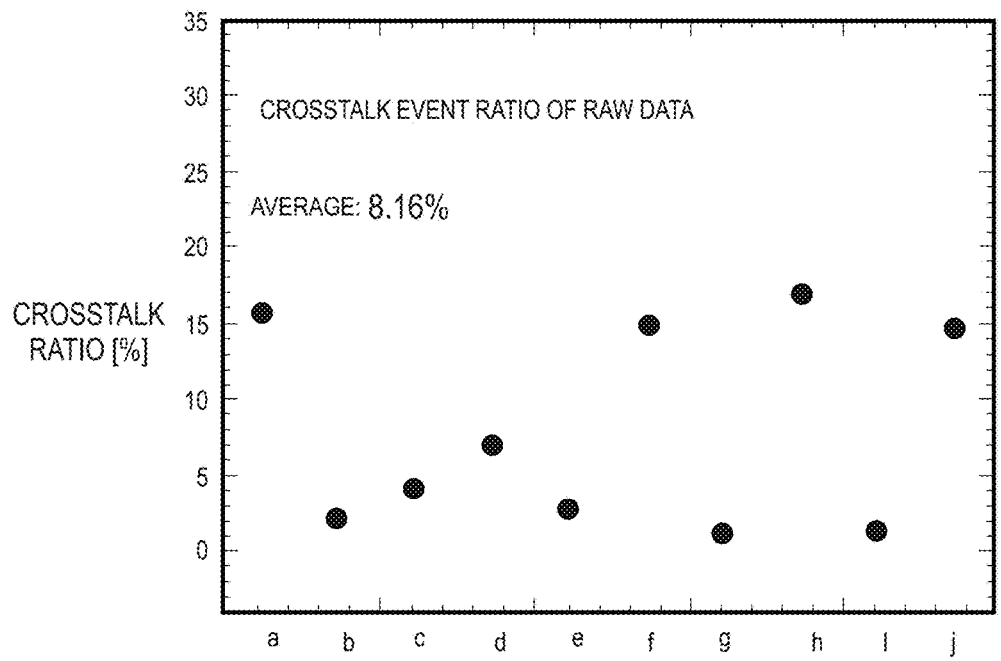
FIG. 15 is a diagram illustrating an example of crosstalk event counts of raw data.
Figure 16:
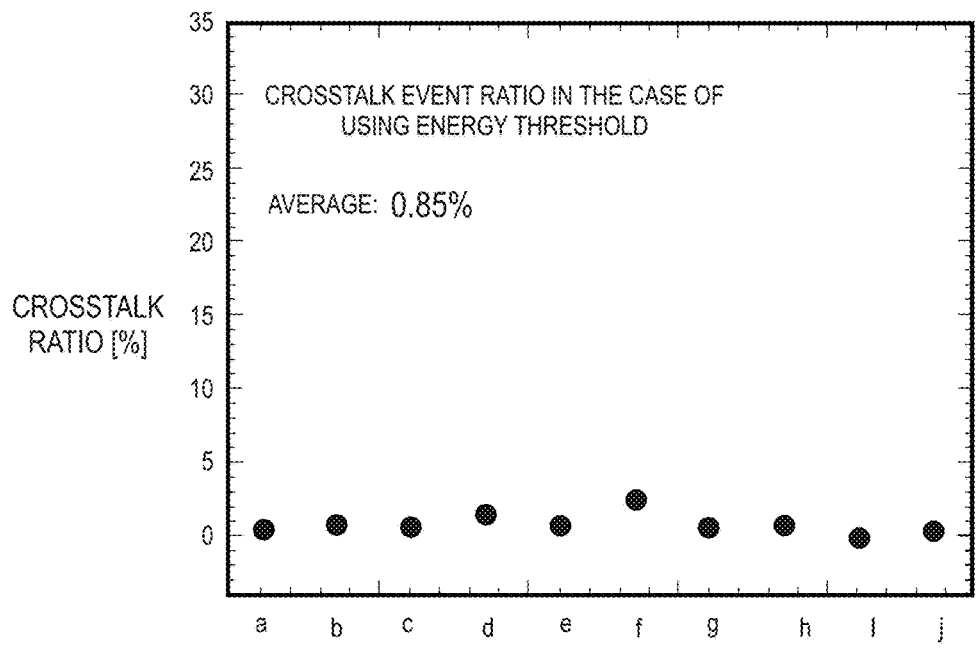
FIG. 16 is a diagram illustrating an example of event counts after crosstalk event removal by energy.

FIG. 15 illustrates a ratio of the crosstalk events among the event counts in the raw data obtained by the simulation, and FIG. 16 illustrates a ratio of the crosstalk events within the event counts when discrimination is performed using the energy threshold. As described above, it can be seen that the ratio of the number of crosstalk events in the raw data is 8.16%, but, when discriminating using the energy threshold, the ratio of the number of crosstalk events is 0.85%, indicating that most of the crosstalk events have been eliminated.

As described above, when using scintillators of two different materials, Vp/Qtotal spreads over a wide range, so that signals from more scintillator elements may be discriminated. Furthermore, when alternately arranging scintillator elements made of two types of scintillators, it is possible to eliminate crosstalk events by eliminating events that become energy therebetween based on the difference in the output energy (number of photons), and it is possible to correct to the correct count number.

<PET Examination Device>

Figure 17:
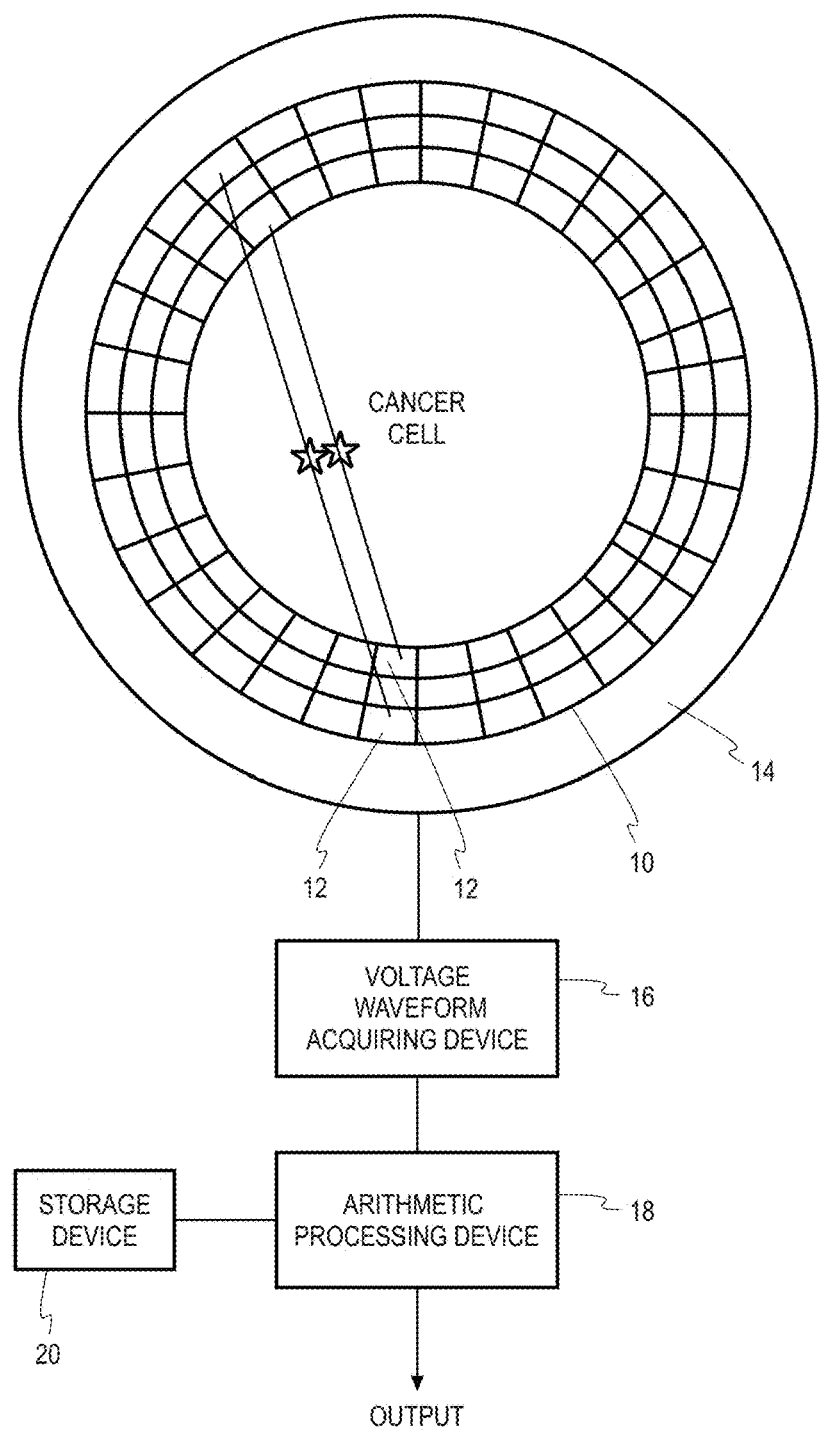
FIG. 17 is a diagram illustrating an example of a configuration of a DOI detector.

FIG. 17 is a schematic diagram of a PET examination device (radiation detecting device). A scintillator array group in which a large number of scintillator arrays 10 are arranged is provided so as to surround the space in which a patient is placed. The radiation source is annihilation γ rays of 511 keV, which are caused by positron emission nuclides accumulated in cancer cells of the patient. Signals from the respective scintillator arrays 10 are separately photoelectrically converted by the photomultiplier tube 14. One photomultiplier tube 14 is provided corresponding to one or a plurality of scintillator arrays 10, and electrical signals are separately obtained from the respective scintillator elements 12 of the respective scintillator arrays 10. The obtained electrical signals from the respective scintillator elements are converted into voltage waveform signals by the electric waveform acquiring device 16, and the obtained voltage waveform signals from the respective scintillator elements 12 are supplied to the arithmetic processing unit 18. The arithmetic processing unit 18 identifies from which scintillator element 12 the signal is derived, from each supplied voltage waveform signal, and identifies a pair of scintillator elements 12 measured at the same time. Further, the three-dimensional position (spatial position) of a cancer cell in which annihilation γ rays are generated is identified based on the identification result of the pair of scintillator elements 12 obtained by a plurality of pairs of scintillator elements 12 obtained with the lapse of time. That is, the spatial position may be identified by identifying intersections of a plurality of straight lines formed by the pair of scintillator elements 12. Each component of the PET examination device may adopt the above-described configuration.

<Other Configuration Examples>

The same is carried out by using Qtotal/Vp instead of Vp/Qtotal.

The scintillator array is configured to extend in one direction from the photomultiplier tube, but it is not limited thereto, and a plurality of scintillator elements may be arranged on one light receiving surface of the photomultiplier tube such that light from the scintillator elements is incident on the photomultiplier tube. Thus, when processing the output from one photomultiplier tube, it is possible to detect one among the plurality of scintillator elements, on which the radiation is incident.

The decay time constant of the emitted light of the scintillator element may be controlled by changing the concentration of the activating material (for example, Ce of GSO:Ce) in the scintillator element. Further, it may also be controlled by changing the material (GSO, LuAG) of the scintillator element. By using both of them, it is possible to increase the number of discriminable scintillator elements. Three or more kinds of materials may be used for the scintillator elements.

When the material (GSO, LuAG) of the scintillator elements is different, the number of generated photons (energy) in one event is different. Therefore, it is also possible to discriminate a scintillator element on which the radiation is incident, by the energy difference.

<Another Example of Determining Process of Threshold>

In FIG. 7, Vp/Qtotal was plotted against energy, and the threshold was determined such that Vp/Qtotal having different delay times were separated in the vicinity of 511 keV. In the case of stacking scintillators, the scintillator farther from the photomultiplier tube has a lower amount of light. Even for signals for γ rays of the same energy, the amount of light varies depending on the difference of the scintillators. Therefore, Qtotal will be used instead of energy. Qtotal is simply designated as Q.

Figure 18A:
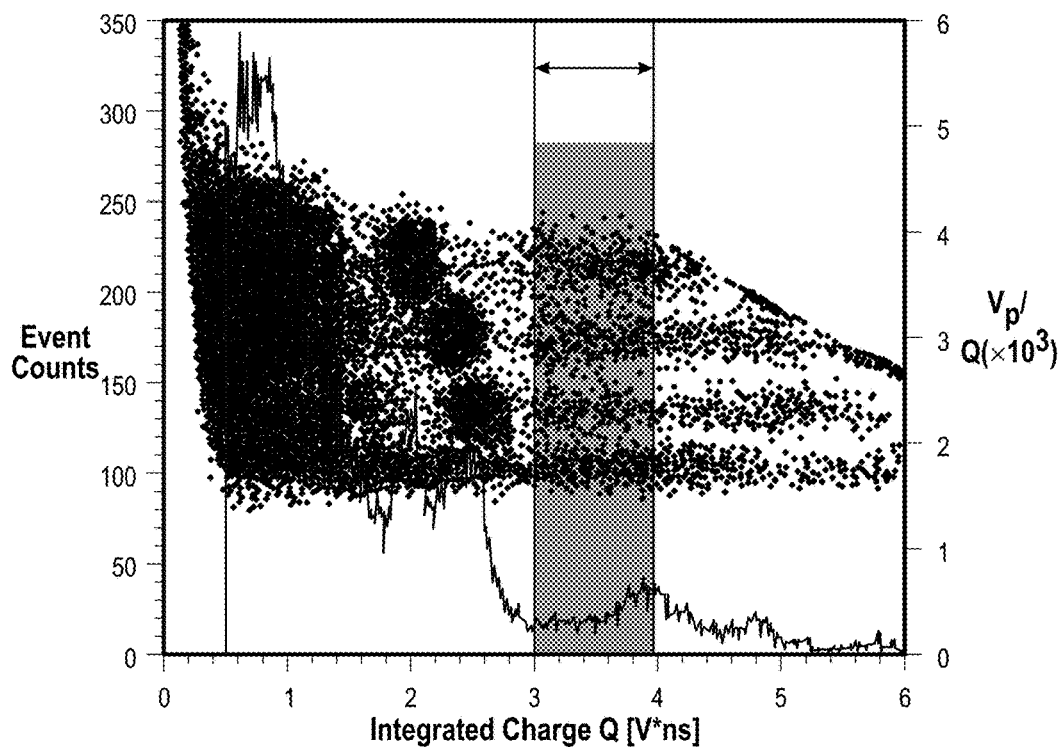
FIG. 18 is a diagram for explaining another example of a threshold value determination processing.
Figure 18B:
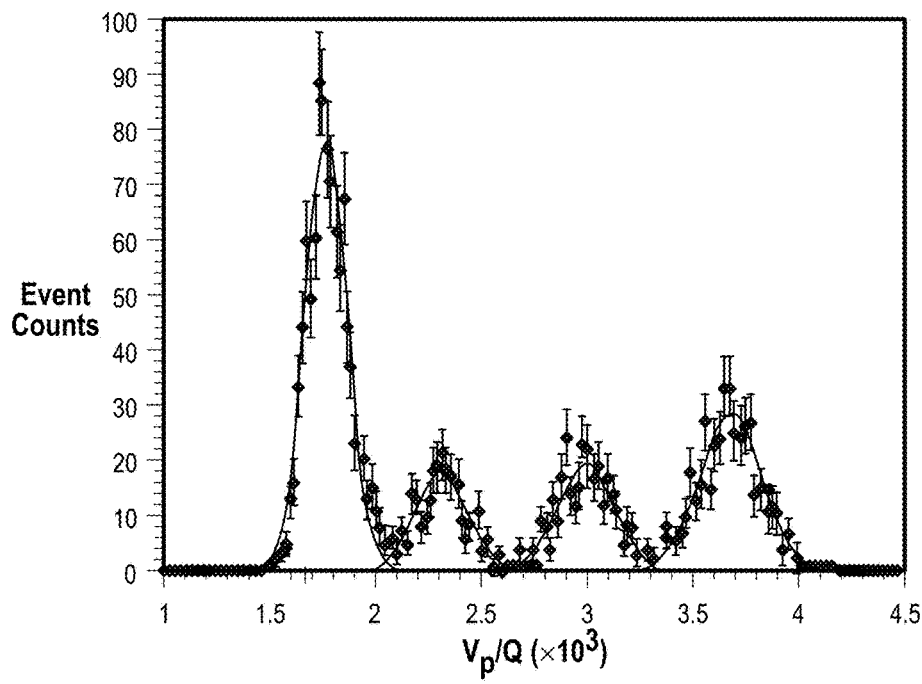
Figure 18C:
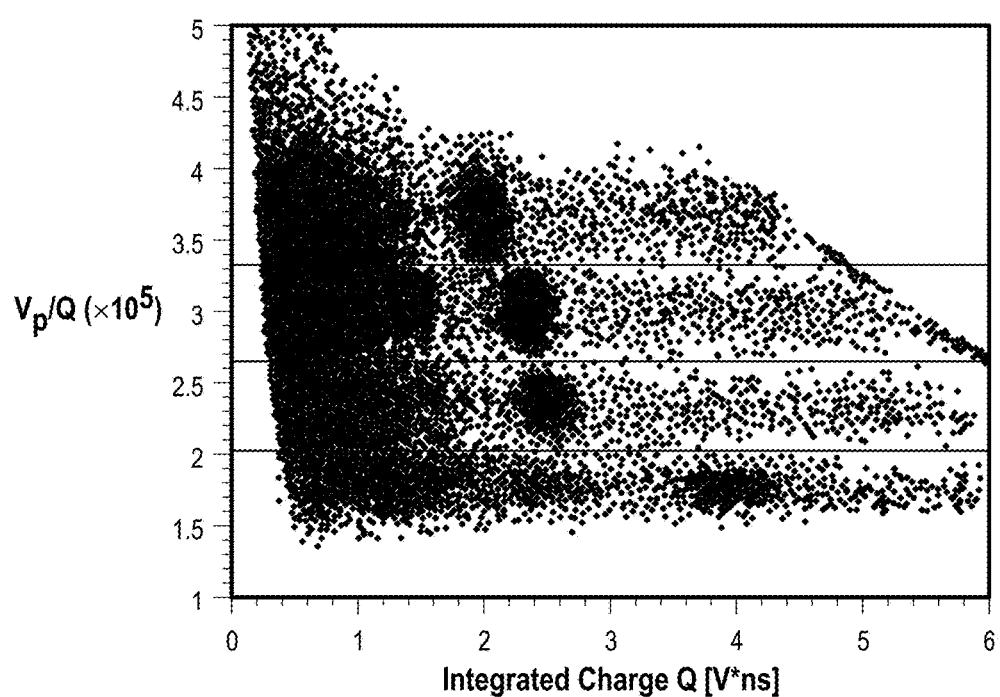
Figure 19A:
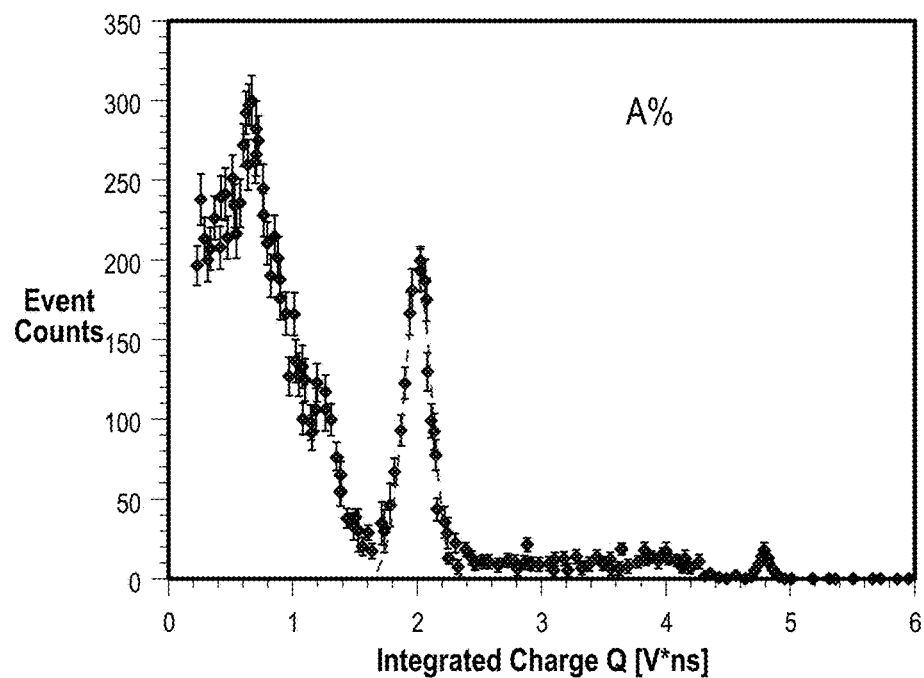
FIG. 19 is a view illustrating an event discriminated by using the determined threshold value.
Figure 19B:
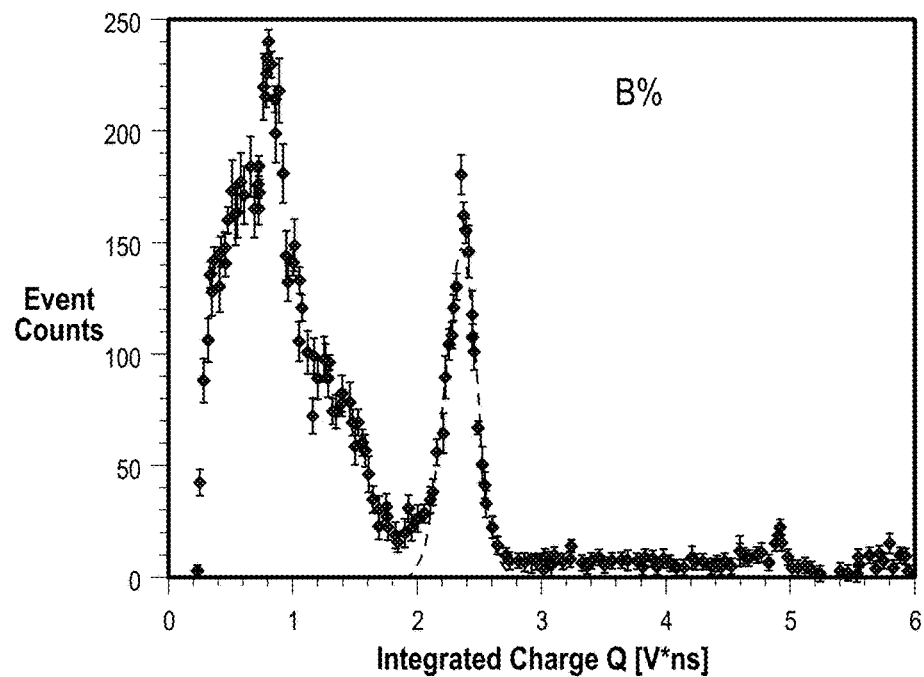
Figure 19C:
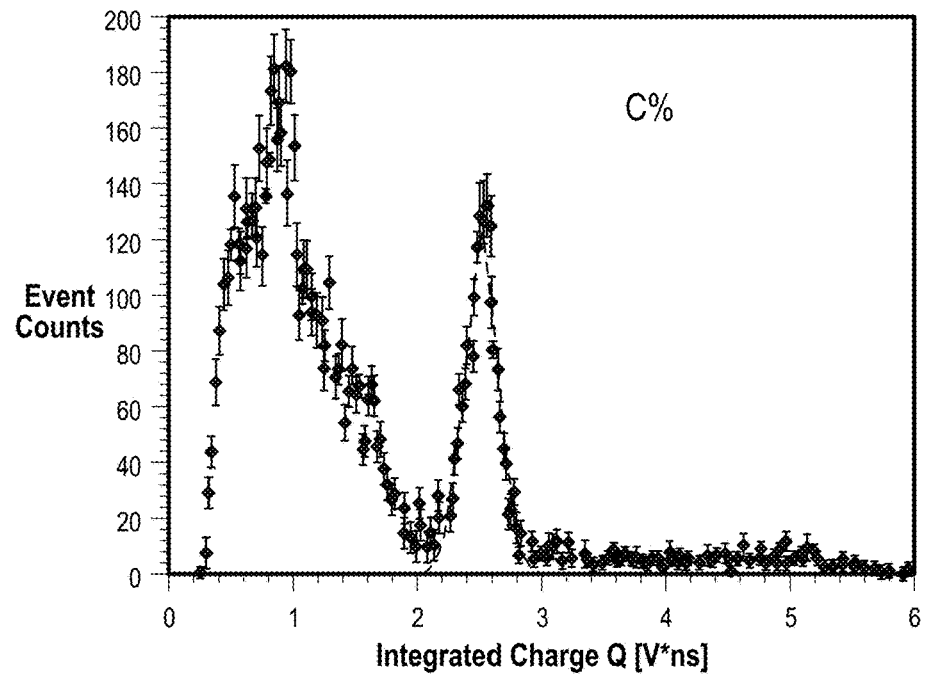
Figure 19D:
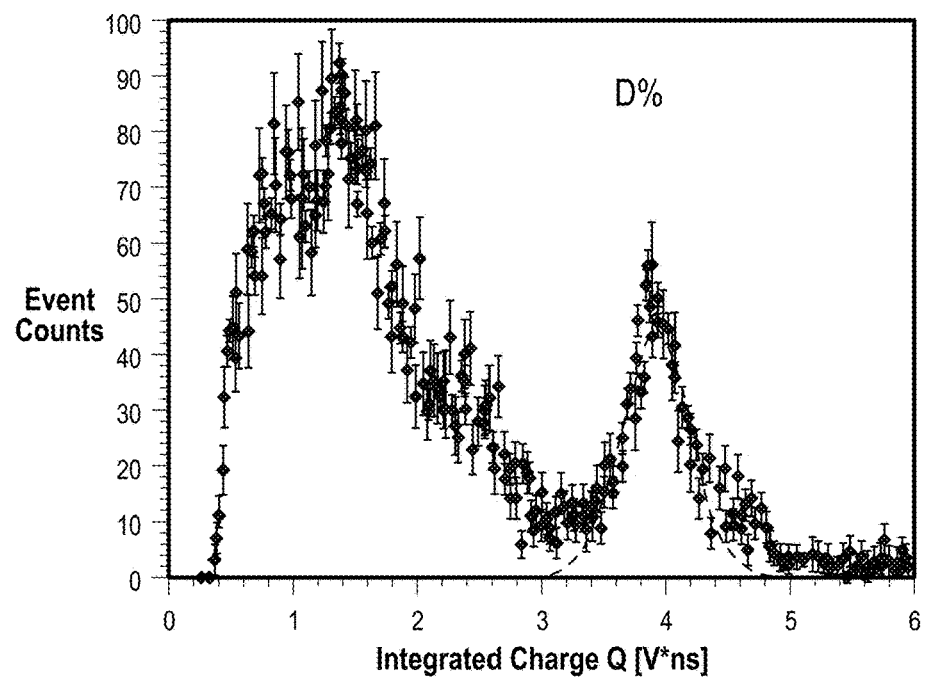

FIG. 18 illustrates measurement results of events using four GSO scintillator elements having different Ce concentrations. As the four GSO scintillator elements with different Ce concentrations, GSO:Ce A mol %, GSO:Ce B mol %, GSO:Ce C mol %, GSO:Ce D mol % were prepared. Here, A, B, C, and D indicating the Ce concentration are about 0.25 mol % to 1.75 mol %, and A>B>C>D.

As illustrated in FIG. 18 (A), Vp/Q is plotted against the total charge Q (integrated charge). In the range of 3 to 4 [V*ns] of the total charge Qtotal (Q), the detection results of the four GSO scintillators are relatively separated. Since a Vp/Q value is basically constant regardless of the energy of the γ rays, a detailed Vp/Q threshold for each scintillator may be set by picking up events in this range and creating a histogram for the Vp/Q value as illustrated in FIG. 18 (B). From this figure, it is possible to set a threshold for discriminating each scintillator in the middle of the centers of adjacent peaks.

FIG. 18 (C) illustrates the distribution of the Vp/Q value with respect to Q separated by the threshold value thus obtained. Therefore, it can be seen that the detection results of the four GSO scintillator elements may be separated.

Then, the result of creating an energy spectrum after dividing the measurement data for each threshold value determined as described above is illustrated in FIG. 19. The dotted line is the result of fitting an event of 511 keV. FIG. 19 illustrates the number of events for the total charge Q at A mol % of GSO:Ce (A), at B mol % of GSO:Ce (B), at C mol % of GSO:Ce (C), and at D mol % of GSO:Ce (D).

The events of 511 keV in FIG. 7 are circular groups near 0.5 MeV, which are elliptical groups near the center of data separated for each scintillator even in FIG. 18 (C). Therefore, the events of the four GSO scintillator elements may be clearly separated.

<Effect of Exemplary Embodiments>

According to the present exemplary embodiment, signals from a plurality of scintillator elements obtained by the photoelectric converter may be separated by using scintillator elements having different decay time constants of emitted light. Therefore, it is possible to effectively perform discrimination of signals (discrimination of radiation incidence scintillators) in the DOI detector.

Since light from each scintillator is incident on one photoelectric converter by using a scintillator array in which the scintillator elements are arranged in one row, it is possible to easily configure the DOI detector.

Furthermore, a plurality of scintillator arrays may be collectively formed to form a block, so that light may be incident on the photoelectric converter from individual light receiving surfaces.

In the scintillator element, the decay time constant of the scintillator element may be easily changed by changing the concentration of the activating material.

In the scintillator element, the decay time constant of the scintillator element may also be changed by changing the material.

In the scintillator element, it is possible to discriminate signals from more scintillator elements by changing both the concentration of the activating material and the material.

When using the scintillation light detecting device according to the embodiment, it is possible to effectively perform discrimination of signals in the DOI detector and to effectively perform PET examination.

REFERENCE SIGNS LIST 10 scintillator array, 12, 121, 122 scintillator element, 14 photomultiplier tube, 16 electric waveform acquiring device, 18 arithmetic processing device, 20 storage device.

The invention is claimed:

1. A scintillation light detecting device comprising:
a scintillator array in which a plurality of scintillator elements having different decay time constants of emitted light generated by an incident event of radiation are arranged;
a photoelectric converter that receives light output from the plurality of scintillator elements of the scintillator array and converts the light into an electrical signal having a voltage waveform; and
an arithmetic processing device configured to detect, for the event, a peak value in the voltage waveform of the electrical signal and an integrated charge amount in the voltage waveform of the electrical signal from the photoelectric converter and identify a scintillator element in the scintillator array to which the electrical signal, resulting from the incidence of the radiation onto the scintillator element, is attributed, in accordance with a ratio between the detected peak value and the integrated charge amount.

2. The scintillation light detecting device according to claim 1, wherein, in the scintillator array, the plurality of scintillator elements are arranged in one row, and light from the plurality of scintillator elements is output from a scintillator element at one end of the one row.

3. The scintillation light detecting device according claim 2, wherein the plurality of scintillator elements having different decay time constants include scintillator elements in which concentrations of activating materials are different from each other.

4. The scintillation light detecting device according to claim 2, wherein the plurality of scintillator elements having different decay time constants include scintillator elements in which materials constituting the scintillator elements are different from each other.

5. The scintillation light detecting device according to claim 2, wherein the plurality of scintillator elements having different decay time constants include scintillator elements in which concentrations of activating materials are different from each other and materials constituting the scintillator elements are different from each other.

6. The scintillation light detecting device according to claim 2, wherein a plurality of the scintillator arrays are arranged,
the photoelectric converter separately receives light from individual scintillator arrays and outputs separate electrical signals, and
the arithmetic processing device identifies a scintillator element of a scintillator array to which each of the electrical signals, resulting from the incidence of the radiation onto the scintillator element of the scintillator array, is attributed, in accordance with a ratio between a peak value and an integrated charge amount in a voltage waveform of each of the electrical signals.

7. The scintillation light detecting device according claim 6, wherein the plurality of scintillator elements having different decay time constants include scintillator elements in which concentrations of activating materials are different from each other.

8. The scintillation light detecting device according to claim 6, wherein the plurality of scintillator elements having different decay time constants include scintillator elements in which materials constituting the scintillator elements are different from each other.

9. The scintillation light detecting device according to claim 6, wherein the plurality of scintillator elements having different decay time constants include scintillator elements in which concentrations of activating materials are different from each other and materials constituting the scintillator elements are different from each other.

10. The scintillation light detecting device according claim 1, wherein the plurality of scintillator elements having different decay time constants include scintillator elements in which concentrations of activating materials are different from each other.

11. The scintillation light detecting device according to claim 1, wherein the plurality of scintillator elements having different decay time constants include scintillator elements in which materials constituting the scintillator elements are different from each other.

12. The scintillation light detecting device according to claim 11, wherein the arithmetic processing device eliminates a crosstalk event using differences in output energy and the ratio between the peak value and the integrated charge amount in the voltage waveform of each electrical signal, with respect to the plurality of scintillator elements having different materials.

13. The scintillation light detecting device according to claim 1, wherein the plurality of scintillator elements having different decay time constants include scintillator elements in which concentrations of activating materials are different from each other and materials constituting the scintillator elements are different from each other.

14. The scintillation light detecting device according to claim 13, wherein the arithmetic processing device eliminates a crosstalk event using the difference in output energy with respect to the plurality of scintillator elements having different materials.

15. A radiation detecting device comprising:
  a scintillator array group in which a plurality of scintillator arrays in which a plurality of scintillator elements having different decay time constants of emitted light generated by an incident event of radiation are arranged, are disposed at a plurality of spatially different positions;
  a photoelectric converter that receives light output from each of the plurality of scintillator elements of the scintillator arrays of the scintillator array group and converts the light into an electrical signal for each of the scintillator elements; and
  an arithmetic processing device configured to detect a spatial position of a radiation source by identifying a scintillator element in the scintillator array to which the electrical signal, resulting from incidence of radiation onto the scintillator element, is attributed and identifying a plurality of scintillator elements on which the radiation is incident, in accordance with a ratio between a peak value in a voltage waveform of the electrical signal and an integrated charge amount in the voltage waveform from the photoelectric converter.

* * * * *